United States Patent Office 3,313,724
Patented Apr. 11, 1967

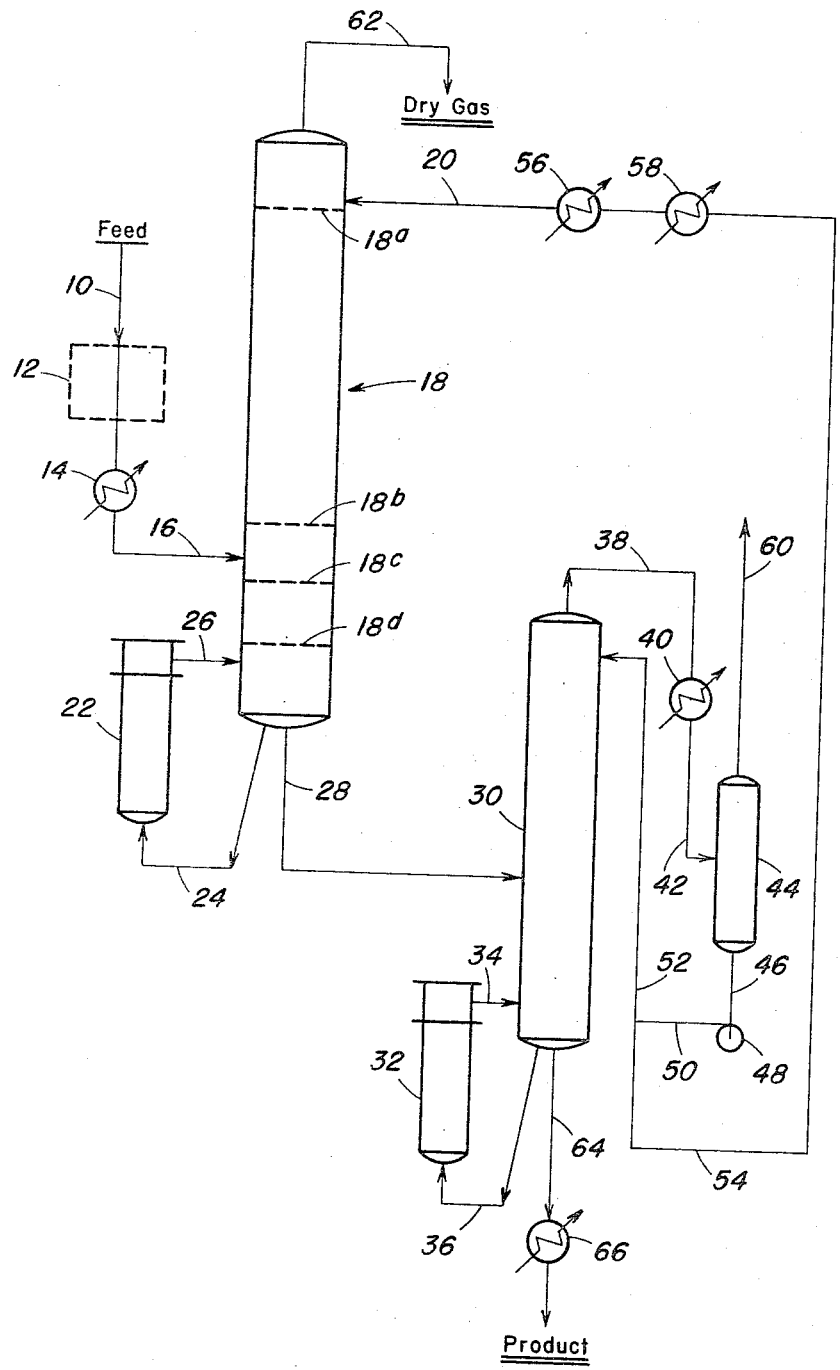

3,313,724
PROCESS FOR THE SEPARATION OF NORMALLY GASEOUS HYDROCARBON MIXTURES
Ludwig Kniel, Scarsdale, N.Y., assignor to The Lummus Company, New York, N.Y., a corporation of Delaware
Filed Mar. 29, 1965, Ser. No. 443,327
11 Claims. (Cl. 208—340)

This invention relates generally to the separation of hydrocarbons and, more particularly, to a method of recovering natural gasoline fractions from natural gas. The invention features an improved process for recovering natural gasoline fractions which does not require additional apparatus to remove undesirable light fractions, requires no separate absorbing oil, and requires much less fuel than presently used processes.

Natural gasoline fractions normally liquid at ambient conditions of temperature and pressure, as well as butanes, propane, etc., are generally recovered from natural gas by the use of an absorption process. In such a process, an oil heavier than the heaviest hydrocarbon in the natural gas is normally used to absorb the desirable fractions in the natural gas into the liquid phase, and subsequently, by the application of heat, to give up these fractions. In essence, such a plant consists of an absorber and a still. The absorption oil commonly circulates between the absorber and the still, alternately being enriched with, and then denuded of, the fractions which it is desired to recover.

One of the problems of absorption of desirably hydrocarbons into the lean absorption oil, as for instance all butanes, pentane, hexanes and the like, is that some of the lighter undesirable fractions, such as propane, ethane and methane contained in the feed, are also retained in the absorption oil. As is well known to those skilled in the art, additional apparatus is normally required to eliminate these fractions between the absorber and the still stabilizer, or after the still, to keep them out of the product. Removal of these fractions is known as stabilizing the product. It is also well known that the cost of an absorption plant to recover a specified product, as for instance a 24-70 grade natural gasoline, is primarily a function of the volume of the absorption oil that must be circulated to effect the desired recovery. Further, when the recovery of lighter fractions, for instance all of the butanes or a substantial percentage of propane is involved, this can be accomplished in a conventional way only by increasing the oil circulation and the heat input to the still; naturally, this increases cost.

It is thus a general object of the present invention to provide a process of recovering natural gasoline fractions from natural gas which overcomes all the foregoing difficulties of the conventional absorption processes.

Another object of the present invention is to provide a process wherein lighter undesirable fractions (propane, ethane, methane, etc.) can be removed without utilizing additional apparatus.

It is still another object of the present invention to provide a process for recovering natural gasoline from natural gas which does not employ an extraneous oil as absorbing medium.

Yet another object of the present invention is to provide a process of recovering natural gasoline fractions from natural gas wherein the fuel requirement is substantially less than in conventional absorption processes.

Various other objects and advantages of the invention will become clear during the course of the following description of several embodiments thereof, and the novel features will be particularly pointed out in connection with the appended claims. While the invention will be described with reference to natural gas separations, it will be obvious that the process may be employed for the recovery of desirable fractions from other gases such as refinery gases, effluent gases from pyrolitic processes, and the like.

In essence, the present invention comprises the following steps: The desirable gasoline fractions are condensed and removed in a primary fractionation zone, and then the part of the component lighter than the desirable components is removed in a stripping zone from the stream descending from the fractionation zone into the stripping zone, so as to obtain stripper bottoms product which contains all the desirable material which it is the object to remove and, in addition, also contains various amounts of hydrocarbons equal to and lighter than the lightest components which it is desired to recover. The components lighter than the desired product are removed as net overhead from a second fractionation zone, which zone may operate at a higher or lower pressure than the primary fractionator and stripper. The net overhead produce is condensed fully or nearly fully, and is then subcooled and introduced onto the top deck of the primary fractionator as reflux. The composition of this reflux with respect to the vapor entering the top deck of the primary fractionator from below is as follows: The concentration of the heaviest component in the reflux is greater than corresponds to the equilibrium concentration between the reflux and the vapors entering the top deck, and the concentration of the lightest component in the reflux is less than corresponds to the equilibrium concentration between the reflux and the vapor entering the top deck.

The reflux stream from the top plate and the overhead vapor are in phase equilibrium, of course, or nearly so, but in coming to the equilibrium on the top deck, the reflux entering becomes more nearly saturated with the lighter components in which it is deficient from the point of view of phase equilibrium and releases some of the heaviest components in which it is supersaturated from the point of view of phase equilibrium into the vapor phase. This exchange causes a change in temperature of the reflux to that existing on the top deck, the latter corresponding to the dew point of the net overhead vapors from the primary fractionator.

A better understanding of the invention will be gained by referring to the accompanying drawing, which is a flow sheet or flow diagram of an embodiment of the invention. Of course, it will be understood that this flow sheet is illustrative only and should not be interpreted in a limiting sense.

With reference to the drawing, natural gas enters through line 10 and if necessary is passed over dryers 12, which may employ a desiccant or glycol, and is then cooled and partially condensed in heat exchanger 14, passing in line 16 to primary fractionator 18. It is to be noted that condensation in heat exchanger 14 is preferentially carried to a temperature at which the resulting condensate volume is somewhat greater than the volume of heavy constituents to be withdrawn from the process. This, however, is not a necessary condition for the successful operation of the process. Of course, if the feed is already dry when entering the plant, it need not be in the vapor phase and might already be a mixed phase feed, in which case the need for precondensing exchanger 14 is either reduced or eliminated.

Primary fractionator 18 receives reflux to the top plate through line 20 and is reboiled in a conventional manner by means of reboiler 22 connected to fractionator 18 by lines 24 and 26.

The bottoms product from primary fractionator 18 passes in line 28 to secondary fractionator 20, which is operated in the conventional manner with reboiler 32 connected thereto by lines 34 and 36, and with gross overhead in line 38 being passed to condenser 40. The gross overhead in line 38 is preferably completely condensed in condenser 40 and is then passed via line 42 into drum 44. Condensate leaves drum 44 in line 46 and is pumped by pump 48 into line 50, and is then divided into two streams, 52 and 54 respectively. In line 52, a sufficient portion of the condensate is returned to secondary fractionator 30 as reflux. The remaining portion of the condensate is passed in line 54 to subcoolers 56 and 58, and through line 20 as reflux to the primary fractionator 18. It is to be noted that uncondensed vapors may be withdrawn from drum 44 in line 60, and utilized for fuel purposes, but any substantial withdrawal will decrease the thermal efficiency of the process. Net overhead produce (dry gas) leaves primary fractionator 18 as vapor through line 62. Net produce is withdrawn in secondary fractionator 30 through line 64 and exchanger 66.

Understanding of the invention will be further enhanced by referring to the specific examples set forth hereinbelow, which are intended to be illustrative only and should not be interpreted in a limiting sense.

EXAMPLES

The process of the invention is operated with a natural gas feed containing about 0.6 gallon (U.S.) of pentanes and heavier and about 1.5 gallons (U.S.) of butanes per 1000 standard cubic feet. The composition of the gas as delivered and after acid gas removal is set forth hereinbelow in Table I.

TABLE I

|  | As delivered, mols/100 mols | After acid gas removal, mols/100 of gas delivered |
|---|---|---|
| Methane | 57.8 | 57.8 |
| Ethane | 20.7 | 20.7 |
| Propane | 11.5 | 11.5 |
| Iso-butane | 1.3 | 1.3 |
| N-butane | 3.3 | 3.3 |
| Iso-pentane | 0.7 | 0.7 |
| N-pentane | 0.8 | 0.8 |
| Hexane plus | 0.1 | 0.1 |
| Carbon Dioxide | 3.3 |  |
| Hydrogen Sulfide | 0.5 |  |
| Total | 100.0 | 96.2 |

Operation of the process for the recovery of pentanes and heavier is set forth hereinbelow in Tables II and III.

TABLE II.—(RECOVERY OF PENTANES)

| Process unit or stream: | Pressures and temperatures |
|---|---|
| Partially condensed feed 16 | °F 46 |
| Primary fractionator 18 | p.s.i.a 450 |
| Plates 18a | °F 40 |
| Plates 18b | °F 48 |
| Plates 18c | °F 89 |
| Plates 18d | °F 127 |
| Reflux 20 | °F 40 |
| Reboil 24 | °F 127 |
| Bottoms product 28 | °F 170 |
| Secondary fractionator 30 | p.s.i.a 320 |
| Drum 44 | °F 100 |
| Dry gas 62 | °F 47 |
| Secondary bottoms 64 | °F 322 |
| Quenched product 66 | °F 100 |

TABLE III.—STREAM COMPOSITIONS—MOLS PER 100 MOLS OF FEED AS DELIVERED (RECOVERY OF PENTANES)

| Phase | Feed Stream Vapor | Feed Stream Vapor | Feed Stream Liquid | Prim. Fract. Botts. Stream Liquid | Prim. Fract. Reb. Vapors Stream Vapor | Prim. Fract. Reflux Stream Liquid | Sec. Fract. Botts. Stream Liquid | Prim. Fract. Off. Stream Vapor |
|---|---|---|---|---|---|---|---|---|
| Methane | 57.8 | 56.48 | 1.32 | .42 | 1.32 | .42 | | 57.8 |
| Ethane | 20.7 | 19.09 | 1.61 | 1.80 | 3.28 | 1.80 | | 20.7 |
| Propane | 11.5 | 9.30 | 2.20 | 4.32 | 4.28 | 4.315 | | 11.5 |
| Iso-butane | 1.3 | .88 | .42 | .98 | .63 | .98 | .003 | 1.297 |
| N-butane | 3.3 | 2.07 | 1.23 | 3.08 | 1.71 | 2.91 | .174 | 3.125 |
| Iso-pentane | .7 | .32 | .38 | .70 | .24 | .00 | .694 | .006 |
| N-pentane | .8 | .32 | .48 | .80 | .23 | .00 | .798 | .002 |
| Hexanes plus | .1 | .02 | .08 | .10 | .02 | .00 | .100 | .000 |
| Total mols | 96.2 | 88.48 | 7.72 | 12.19 | 11.71 | 10.42 | 1.769 | 94.43 |
| Total lbs | 2,435 | 2,104 | 331 | 602 | 479 | 476 | 126 | 2,309 |

In Table II the temperatures and pressures for the various process units and streams are set forth, and in Table III the compositions and volumes of circulating and removed streams are set forth.

Tables IV and V illustrate the operating parameters for the process when it is operated for the recovery of butanes and heavier components from the same natural gas composition as set forth above in Table I. In particular, Table IV gives the operating temperatures and pressures for the process unit and streams, and Table V sets forth the composition and volumes of removed and circulating streams.

TABLE IV.—(RECOVERY OF BUTANES AND HEAVIER)

| Process unit or stream: | Pressures and temperatures |
|---|---|
| Partially condensed feed 16 | °F 18 |
| Primary fractionator 18 | p.s.i.a 450 |
| Plates 18a | °F 15 |
| Plates 18b | °F 16.8 |
| Plates 18c | °F 50.5 |
| Reflux stream 20 | °F 15 |
| Reboil 24 | °F 82.1 |
| Bottoms product 28 | °F 125 |
| Secondary fractionator 30 | p.s.i.a 320 |
| Drum 44 | °F 32.4 |
| Dry gas 62 | °F 12.7 |
| Secondary bottoms 64 | °F 252 |
| Quenched product 66 | °F 100 |

TABLE V.—STREAM COMPOSITIONS—MOLS PER 100 MOLS OF FEED AS DELIVERED (RECOVERY OF BUTANES AND HEAVIER)

| Phase | Feed Stream Vapor | Feed Stream | | Prim. Fract. Botts. Stream Liquid | Prim. Frac. Reb. Vapors Stream Vapor | Prim. Fract. Reflux Stream Liquid | Sec. Fract. Botts. Stream Liquid | Prim. Fract. Off. Stream Vapor |
|---|---|---|---|---|---|---|---|---|
| | | Vapor | Liquid | | | | | |
| Methane | 57.8 | 54.21 | 3.59 | 1.20 | 2.78 | 1.20 | | 57.80 |
| Ethane | 20.7 | 16.12 | 4.58 | 5.27 | 6.08 | 5.27 | | 20.70 |
| Propane | 11.5 | 6.15 | 5.35 | 9.30 | 5.36 | 9.21 | .094 | 11.41 |
| Iso-butane | 1.3 | .46 | .84 | 1.29 | .46 | .02 | 1.27 | .03 |
| N-butane | 3.3 | .99 | 2.31 | 3.29 | 1.00 | .002 | 3.29 | .01 |
| Iso-pentane | .7 | .11 | .59 | .70 | .13 | .00 | .70 | .00 |
| N-pentane | .8 | .10 | .70 | .80 | .12 | .00 | .80 | .00 |
| Hexanes plus | .1 | .006 | .094 | .10 | .007 | .00 | .10 | .00 |
| Total mols | 96.2 | 78.16 | 18.04 | 21.95 | 15.94 | 15.70 | 6.25 | 89.95 |
| Total lbs | 2,435 | 1,722 | 713 | 969 | 566 | 584 | 385 | 2,050 |

While the process of the invention has been described hereinabove with respect to the recovery of natural gasoline fractions from natural gas, it will be apparent to those skilled in the art that the process may be applied in other areas where the separation of heavier from lighter hydrocarbon constituents is the objective. In particular, the process of the invention may be operated for the recovery of propylene and propane from refinery gases and, with minor modifications which will be obvious to those skilled in the art, for the recovery of ethylene, or of fractions heavier than ethylene in a plant to recover ethylene from pyrolysis gas and the like. Accordingly, various changes in the processing steps, arrangements of parts and other details may be made by those skilled in the art without departing from the scope of the invention, as defined in the appended claims.

What is claimed is:

1. Process for the separation of normally gaseous hydrocarbon mixtures into lighter and heavier fractions that comprises:

passing said mixture to a first fractionation zone controlled to produce a gaseous light fraction as an overhead and a desired heavier fraction which also contains lighter components which are lighter than the desired heavier fraction as a bottom product;

recovering said overhead;

passing said bottom product to a second fractionation zone controlled to separate said lighter components, as overhead from said desired heavier fraction;

recovering said desired heavier fraction;

substantially completely condensing said lighter overhead components;

employing a first portion of said condensed, lighter overhead components as reflux to the top plate in said first fractionation zone; and employing the remaining portion of said condensed lighter components as reflux in said second fractionation zone.

2. The process as claimed in claim 1, and additionally comprising further cooling said first portion of condensed, lighter overhead components prior to use as reflux in said first fractionation zone.

3. The process as claimed in claim 1, wherein said mixture is partially liquified prior to entering said first fractionation zone.

4. The process as claimed in claim 1, wherein said mixture is a natural gas and said desired heavy fraction is a natural gasoline fraction.

5. Process for the separation of normally gaseous hydrocarbon mixtures into lighter and heavier fractions that comprises:

partially condensing said mixture;

passing said mixture to a first fractionation zone controlled to produce a desired lighter fraction as an overhead and a heavier fraction containing lighter components which are lighter than the desired heavier fraction as a bottom product;

recovering said overhead;

passing said bottom product to a second fractionation zone controlled to separate said lighter components from said desired heavier fraction;

recovering said desired heavier fraction;

substantially completely condensing said lighter components; and employing said condensed lighter components as reflux to the top plate in said first fractionation zone and as reflux in said second fractionation zone.

6. The process as claimed in claim 5, wherein said partial condensation is effected so as to produce a volume of condensate slightly greater than the desired volume of said bottoms product.

7. The process as claimed in claim 5, wherein the reflux employed in said first fractionation zone is cooled prior to being passed into said first fractionation zone.

8. Process for the separation and recovery of natural gasoline fractions from a natural gas that comprises:

condensing a portion of said natural gas;

passing the partially condensed gas-liquid mixture to a first fractionation zone;

producing within said zone, a gaseous fraction and a liquid fraction, said liquid fraction containing said desired gasoline fractions and also components lighter than said gasoline fractions;

recovering said gaseous fraction;

passing said liquid fraction to a second fractionation zone;

separating within said second zone said desired gasoline fractions from said lighter components;

recovering said gasoline fractions in liquid form;

passing said lighter components to a condensation zone and substantially completely condensing said lighter components therein;

dividing said condensed lighter components into a first stream and a second stream;

cooling said first stream in a heat exchange zone;

passing said cooled stream as reflux to the top plate in said first fractionation zone; and passing said second stream as reflux to said second fractionation zone.

9. The process as claimed in claim 8, wherein said partial condensation is controlled to produce a liquid volume slightly larger than the liquid fraction withdrawn from said first fractionation zone.

10. The process as claimed in claim 8, wherein the reflux passed to said first fractionation zone has a greater concentration of the heaviest component than the equilibbrium concentration between said reflux and the vapor it contacts therein, and said reflux has less concentration of the lightest component than the equilibrium concentration of said reflux and said vapor.

11. The process as claimed in claim 10, wherein said reflux becomes more saturated in said lightest component and less saturated in said heaviest component after contact with said vapor.

References Cited by the Examiner

UNITED STATES PATENTS

| | | | |
|---|---|---|---|
| 2,183,604 | 12/1939 | Barton et al. | 208—351 |
| 2,377,736 | 6/1945 | White | 208—351 |
| 2,487,147 | 11/1949 | Latchum | 208—340 |

DELBERT E. GANTZ, *Primary Examiner.*

HERBERT LEVINE, *Examiner.*